Jan. 16, 1951

M. TURCHAN ET AL 2,538,604

HYDRAULIC DUPLICATING SHAPING AND TURNING
ATTACHMENT FOR LATHES

Filed Nov. 19, 1945

INVENTOR
MANUEL TURCHAN
CURTIS WALKER

By Robert A. Sloman
ATTORNEY

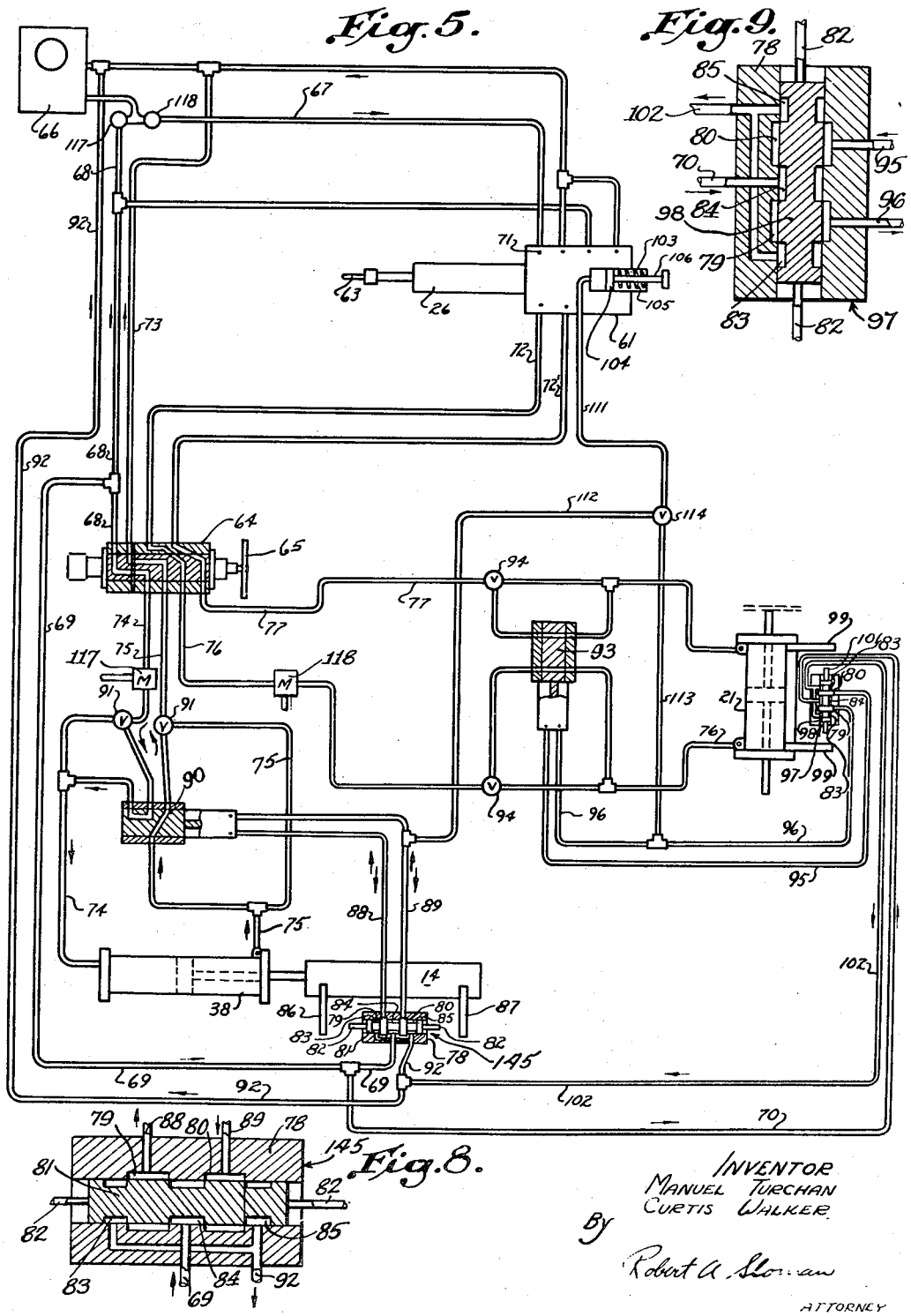

Patented Jan. 16, 1951

2,538,604

UNITED STATES PATENT OFFICE 2,538,604

HYDRAULIC DUPLICATING SHAPING AND TURNING ATTACHMENT FOR LATHES

Manuel Turchan, Dearborn, and Curtis Walker, Detroit, Mich.

Application November 19, 1945, Serial No. 629,492

6 Claims. (Cl. 90—24.3)

This invention relates to a combination hydraulic duplicating shaper and lathe attachment, more particularly the invention relates to an attachment for a lathe incorporating a tracer mechanism operatively engageable with a model to transmit corresponding lathe and shaper feed movements to a cutting tool relative to a work piece.

It is the object of the present invention to provide a lathe attachment for controlling work turning operations as well as shaping operations.

It is the object of this invention to provide longitudinal and cross feed fluid metering valves, a directional control valve, and a reverse valve, together with a telescoping control panel therefor.

It is the further object herein to provide separately operable hydraulic limit valves in conjunction with automatic reverse valves for the longitudinal and for the cross feed cylinders.

It is the further object of this invention to provide a directional control valve for changing tracer control from one cylinder to the other, and constant pressure fluid from one cylinder to the other.

It is the further object of this invention to provide a valve in conjunction with the tracer for automatically effecting a reversal of the tracer control during the inoperative return feed movement of the control cylinder not under tracer control.

These and other objects will be seen from the following specification and claims in conjunction with the appended drawings of which:

Fig. 4 is a right end elevational view of the model shown in Fig. 1.

Fig. 5 is a diagrammatic view of the hydraulic mechanisms therefor and their connections; while Fig. 6 is an enlarged sectional view showing the tracer adjusting mechanism.

Fig. 7 is an enlarged detail view of a portion of Fig. 1 including the means of holding the tracer stem against rotation.

Fig. 8 is an enlarged sectional view of one of the limit valves shown in Fig. 5.

Fig. 9 is an enlarged sectional view of the other of the limit valves shown in Fig. 5; and Fig. 10 is an enlarged detail elevation illustrating the telescoping panel and the controls for the metering valves, directional control valve, and reversing mechanism.

It will be understood that the above drawings illustrate merely one preferable embodiment of the invention and that other embodiments are contemplated within the scope of the claims hereinafter set out.

Figure 1:
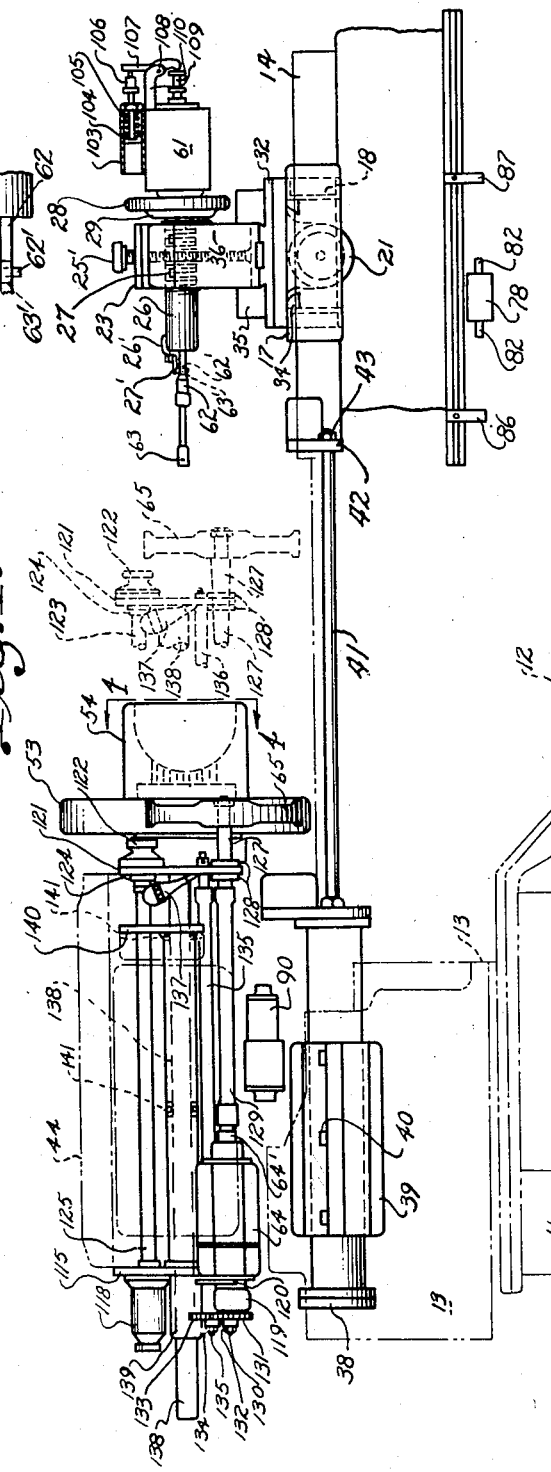
Fig. 1 is a fragmentary elevational view of the lathe attachment.

Referring to the drawings, a lathe is shown in Fig. 1 with legs 11 and formed chip pan 12 thereon. Lathe bed 13, best seen in Fig. 3, is carried by said legs and is adapted to slidably support longitudinally reciprocable carriage 14 in its ways 15 and 16.

Figure 2:
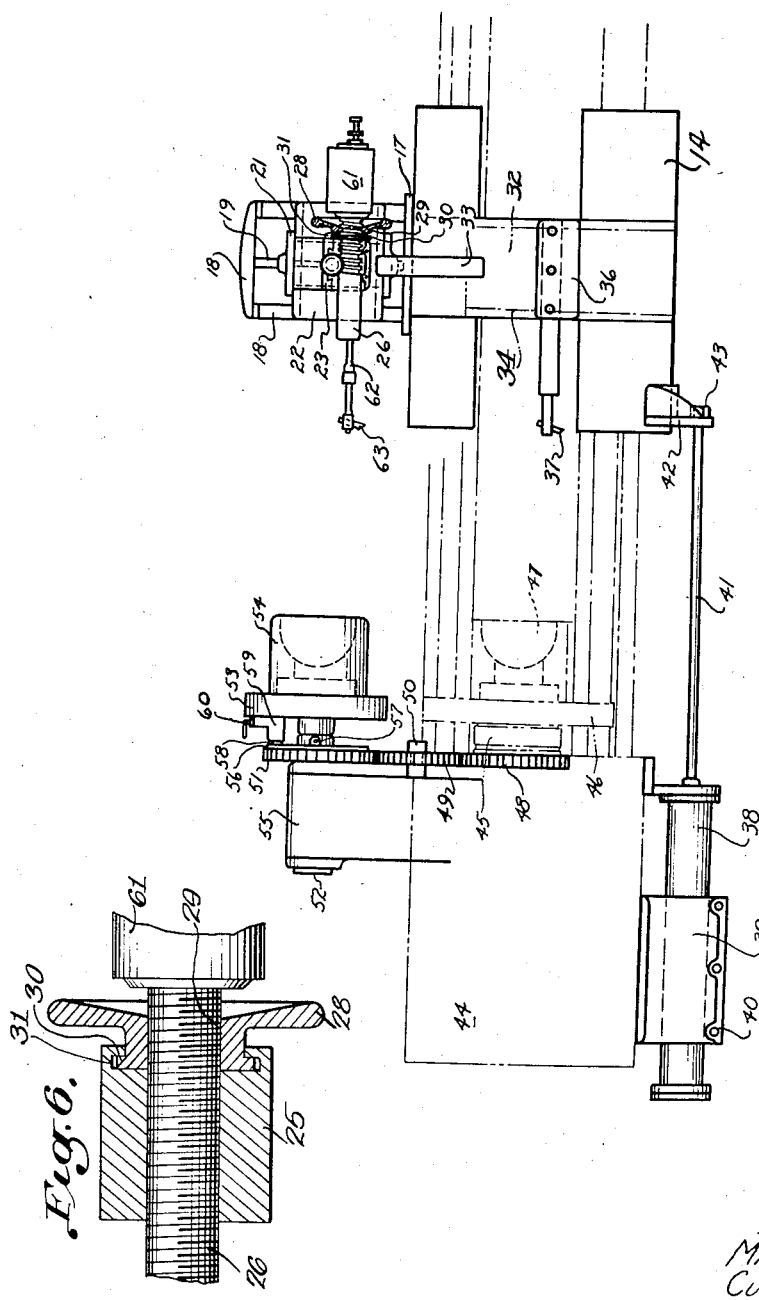
Fig. 2 is a plan view thereof.
Figure 3:
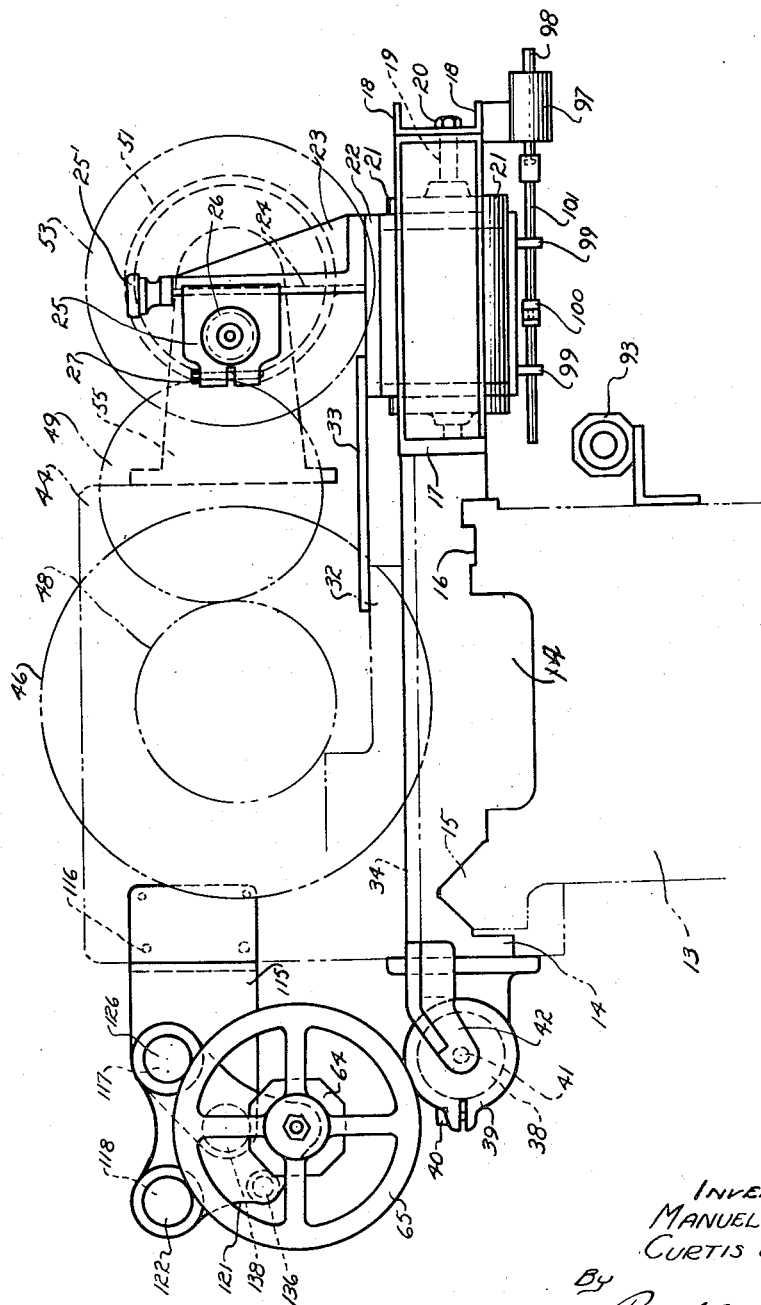
Fig. 3 is a right end elevational view thereof.

Bracket 17, Figs. 2 and 3, on carriage 14 and U-shaped cross feed cylinder supporting bracket 18 secured thereto, provide therebetween a rigid support for stationary piston rod 19 bolted at 20.

Cross feed cylinder 21 is adapted for reciprocal movement relatively to a stationary piston therein which is secured to rod 19. Said cylinder carries a transverse plate 22 which is slidably mounted upon the upper edges of bracket 18.

Tracer supporting angle plate 23 mounted on plate 22 has a dovetail slot 24 therein within which is positioned vertically adjustable tracer housing support 25. Vertical adjusting screw 25' supported within angle plate 23, threadably engages tracer support 25 for effecting manual vertical adjustments thereof. Said support is hollow to adjustable receive exteriorly threaded tracer barrel 26, which may be locked in any adjusted position therein by screws 27.

Longitudinal tracer adjusting wheel 28 has an interiorly threaded hub 29 adapted for threaded engagement with tracer barrel 26. Said hub has an annular flange 30 retained by recessed portion 31 forming a part of tracer support 25 as shown in Fig. 6, whereby rotation of hand wheel 28 will effect longitudinal adjustments of the tracer relative to its support with screws 27 loosened.

Referring to Fig. 3 cross feed movements of cylinder 21 are imparted to cross slide 32 by interconnecting tie bar 33. Said cross slide transversely and slidably mounted on longitudinally adjustable carriage 14 with dovetail connection 34, carries top slide 35 transversely adjustable thereon and carrying tool holder 36 with cutting tool 37.

Stationary longitudinal feed cylinder 38 is mounted within hollow bracket 39 carried by lathe bed 13, and secured within said bracket by screws 40. Said cylinder has a piston movable therein in response to the application of pressure fluid on one side thereof or the other, and has secured thereto movable piston rod 41. Said rod extends out from said cylinder and is joined at its outer end to carriage bracket 42 by nut 43 as illustrated in Fig. 2.

Referring to Figs. 1, 2 and 3, the lathe drive head 44 has a rotatable work spindle 45 carrying face plate 46 to which is secured work piece 47. Gear 48 on spindle 45 meshes with idler gear 49 on stud 50, which in turn meshes with gear 51 loosely journaled on model supporting shaft 52.

Said shaft which rotatably carries face plate 53 and model 54 secured thereto, is in turn rotatably mounted within auxiliary head 55 secured to lathe head 44. For turning operations and reproduction of substantially circular or regular surfaces, gear 51 carrying indexing plate 56 is rotatably secured to shaft 52 by pin 57. Gears 48 and 51 being the same size, work piece 47 and model 54 will rotate in unison.

Under some conditions where the work is regular in shape or in its surface variations, it may be desirable to employ merely a sector of the model, as, for instance, a 90-degree sector. Thus after a 90-degree shaping operation, it is necessary to effect a 90-degree rotation, for instance, of said model sector relative to its supporting shaft 52.

Pin 57 must be withdrawn and likewise pin 58 which extends into a corresponding opening in indexing plate 56. Pin 58 is slidably mounted within housing 59 on face plate 53, and is urged into the index plate opening by a suitable cam on the lower end of manually rotatable shaft 60. Any suitable means may be employed for effecting movement of pin 58 to the right on release of said cam, as for instance a spring. Model sector 54 is then free to rotate 90 degrees, for instance, relative to gear 51, at which point pin 58 is again manually projected to the left within another corresponding opening in index plate 56, and pin 57 reinserted.

Referring to Figs. 1 and 2, tracer barrel 26 has a valve housing 61 within which is a fluid control piston movable therein in response to movements of the tracer spindle 62 which engages said piston, and which projects outwardly from said barrel, terminating in tracer tip 63. The detail of operation and construction of said tracer is fully set out in applicant's Patent Number 2,386,825 dated Oct. 16, 1945, entitled Tracer Mechanism, and also in applicant's co-pending application Serial Number 366,082 filed Nov. 18, 1940, entitled Profiling and Contouring Tracer Mechanism, Hydraulic Connections and Directional Control, now Patent No. 2,390,566, dated December 11, 1945.

Referring to Figs. 1 and 7, it will be noted that bracket 26' is secured to and carried by tracer barrel 26. Arm 27', swivel mounted on bracket 26', has a transverse pin 62' extending therefrom and through elongated transverse slot 63' within spindle 62. Pin 62' has a sliding fit within slot 63' whereby longitudinal movement of spindle 62 is permitted at the same time preventing any rotary movement thereof relative to its barrel housing 26.

With the directional control valve 64, Fig. 1, manually set by hand wheel 65 so that there is constant longitudinal feeding of carriage 14, it will be seen that reactions of tracer tip 63 to the interior surface of model 54 will effect corresponding movements of spindle 62 and the fluid control piston within tracer valve housing 61.

Movements of said valve piston in one direction or the other will effect corresponding cross feed movements of cross feed cylinder 21 so that the cross feed movement of the shaping tool 37 will correspond to similar movements of the tracer tip 63 relative to the surface of the model.

It will be understood that for many shaping operations of the type illustrated in the drawing, reciprocal feed movements of the carriage will be relatively constant with tracer control being directed to the cross feed cylinder governing cross feed movements of the lathe cross slide which carries shaping tool 37. Should it be desired to change constant pressure fluid feeding to the cross feed cylinder, and tracer controlled feeding to the longitudinal feed cylinder, it is necessary to rotate handle 65 of the directional control valve 90 degrees. If it is desired to place tracer control again in the cross feed cylinder but in the opposite direction to its initial setting above, it is necessary to rotate directional control valve hand wheel 65 another 90 degrees. Again, if it is desired to place tracer control in the longitudinal feed cylinder but in the opposite direction, it is necessary to effect another 90 degree rotation of the directional control hand wheel.

In other words, it appears that the direction of tracer action controlling a feed cylinder is reversed by a 180 degree rotation of the directional control valve hand wheel. At the same time constant feeding of the other cylinder is reversed in direction. The detail and operation of the directional control valve 64 is fully set out in applicant's Patent No. 2,374,714 dated May 1, 1945, entitled Directional Control and Reverse Valve.

The diagrammatic illustration of the hydraulic connections for the longitudinal and cross feed cylinders is shown in Fig. 5. Referring to Fig. 5, hydraulic unit 66 with a suitable storage sump, has a fluid pump therein for delivering fluid under pressure through conduits 67 and 68, 69 and 70.

Fluid line 67 goes to intake port 71 on tracer housing 61. Movement of the control valve in housing 61 directs tracer controlled fluid out through either conduit 72 or 72' to directional control valve 64, with exhaust fluid returning in the other thereof.

Fluid under pressure is also delivered to the directional control valve through conduit 68 which is independent of the tracer and is adapted to effect constant feeding of one cylinder or the other. Exhaust fluid from the cylinder under constant feeding is returned to the directional control valve and back to the hydraulic unit through line 73.

There are four lines—74, 75, 76 and 77—adapted to deliver fluid to or receive fluid from the opposite ends of longitudinal feed cylinder 38 and cross feed cylinder 21. One cylinder, as for instance cross feed cylinder 21, will receive tracer controlled fluid at one end through line 76, with exhaust fluid returning to the directional control valve through line 77. A 180-degree turn of hand wheel 65 of the directional control valve will result in tracer controlled fluid delivery through line 77 with exhaust returning in line 76.

With the cross feed cylinder under tracer control, the longitudinal feed cylinder 38 governing feed movements of the carriage 14 will receive constant pressure fluid from the directional control valve through line 74 with exhaust from the other side of the piston returning to the directional control valve through conduit 75. It will be noted that a 180-degree turn of hand wheel 65 will reverse the fluid so that pressure fluid is delivered to line 75 and exhausted through line 74.

In operation, it is desirable to effect an automatic reversal of direction of movement of the cylinder under constant feeding. This is accomplished by a hydraulic limit valve 145 for carriage feed cylinder 38 and hydraulic limit valve 97 for cross slide actuating cylinder 21. Each limit valve consists of a hollow valve housing 78 supported on lathe bed 13, and having a pair of interior annular grooves 79 and 80 formed therein. Valve piston 81 is slidably positioned within housing 78 and has a pair of oppositely extending rods 82 which project out through central openings in said housing. Annular openings 83, 84 and 85 are formed in piston 81.

Fluid under pressure is continuously supplied to valve 145 through line 69 which joins pressure line 68. Spaced dogs 86 and 87 adjustably secured to and depending from carriage 14 in spaced relation are adapted to alternately engage the ends of rods 82 on valve piston 81, to project the latter either to the right or to the left at the end of a predetermined carriage feed stroke.

Depending upon the positioning of piston 81, pressure fluid from opening 84 is directed either to opening 79 for direction out line 88 or to opening 80 for direction out line 89. Lines 88 and 89 join opposite sides of rotary vane reverse valve housing 90. Said valve is interposed between cylinder lines 74 and 75 and may be cut in or out by three-way hand valves 91.

Automatic reverse valve 145 is intended to reverse the direction of feeding of cylinder 38 at the end of a predetermined stroke of the carriage actuated thereby. This is accomplished by the dogs 86 and 87 which are adapted to alternately engage hydraulic limit valve 145 which in turn rotates reverse valve 90 one way or the other. This reversal is automatic and requires no action of the directional control valve.

For instance, with the tracer controlling a reversal of feed of cross feed cylinder 21, it is seen that reverse valve 90 controls the automatic reversal of the longitudinal carriage feed. In the event that it is desired to place tracer control in the longitudinal cylinder 38 by a 90-degree rotation of the directional control valve hand wheel 65, it is seen that the automatic reverse valve 90 must be cut out, and this is done manually by actuating the three-way hand valves 91. Thus fluid travels to and from said cylinder directly through lines 74 and 75.

As before mentioned, in automatically controlling the reversal of the longitudinal feed cylinder, fluid is delivered from the limit valve 145 out either line 88 or 89, and exhaust from one or the other is directed to exhaust port 85 or 83 for return to the hydraulic unit through exhaust line 92. Without describing details, automatic reverse valve 93 is similar to automatic reverse valve 90, and is interposed between fluid lines 76 and 77 which are adapted to deliver and exhaust fluid to and from cross feed cylinder 21, with three-way hand valves 94 provided to either cut in or out said reverse valve.

Similarly, said reverse valve is rotatably actuated by fluid from either line 95 or 96 from opposite ends of limit valve 97. It is seen from Fig. 3 that the fluid controlling piston 98 in said limit valve is alternately positioned at one end or the other of limit valve 97 by spaced dogs 99 which depend from movable cross feed cylinder 21 to alternately engage nut 100 on movable shaft 101 which is coupled to limit valve piston 98.

Fluid pressure line 70 supplies fluid to limit valve 97 and exhaust fluid therefrom is directed through exhaust line 102 which joins exhaust line 92. If cross feed cylinder 21 is to be tracer controlled, which is most likely in the present disclosure, the three-way valves 94 are manually turned to cut out automatic reverse valve 93 inasmuch as the reversal of the cross feed cylinder is to be continuously controlled by the tracer itself. Under such conditions, however, three-way valves 91 are turned to render automatic reverse valve 90 operative to control reciprocal movements of longitudinal feed cylinder 38.

In normal operation, in the embodiment of the invention illustrated in Fig. 2, feeding of the carriage will be constant with limit valve 145 and reverse valve 90 being effective to obtain automatic reversals of feed movements of cutter 37 and tracer 63 on carriage 14 relatively to work piece 47 and model 54 respectively.

Where a shaping operation is indicated, as where it is desired to form longitudinal grooves in a work piece, it is seen that under tracer control the cross feed cylinder will effect the necessary displacements of the tracer and cutter throughout the operative longitudinal strokes thereof as said work piece and model are slowly rotated in unison or indexed.

It is desirable to project the cutter and tracer all the way into the recess to be shaped and to effect tracing and shaping action on the outward longitudinal movement of said cutter and tracer. To accomplish this, it is necessary for the tracer and cutter to fall away from the work piece and pattern toward the central axes thereof at the end of the outward cutting and tracing stroke, so that on the automatic return stroke said cutter and tracer will be free of said work piece and pattern, and free thereof only until the end of said inoperative return stroke.

This is accomplished by a valve mechanism 103, mounted on the tracer housing 61. Normally there is a slight spring tension on the movable valve member within the tracer housing continually directing pressure fluid so as to effect a gradual movement of the tracer tip 63 towards the model and a corresponding movement of cutter 47 towards the work piece.

Valve housing 103 has a piston 104 therein with a spring 105 interposed for normally maintaining the same inoperative. Piston rod 106 projects through housing 103 to operatively engage at one end lever 107 fulcrumed at 108 on tracer housing bracket 109. The other end of lever 107 engages piston rod 110 which projects from the tracer control valve piston. By supplying fluid under pressure through line 111 to housing 103, piston 104 is projected to the right compressing spring 105, and tilting lever 107. The latter effects a movement of tracer valve rod 110 causing a tracer valve movement which has the effect of reversing the normal tendency of the tracer so that the tracer tip 63 and the cutter 37 are projected away from the model and work piece respectively to a limited extent. As soon as the fluid pressure in line 111 is released, piston 104 returns to its normal position under action of spring 105, which in turn permits lever 107 and tracer valve rod 110 to return to their normal position for feeding towards the work piece.

Pressure fluid is supplied to line 111 through either pressure lines 112 or 113 which respectively join fluid pressure lines 89 and 96 coming from cylinder reverse valves 90 and 93 respectively. It will be noted that a three-way hand valve 114 joins lines 111, 112 and 113 so that either line 112 or 113 may be cut out.

While the cross feed cylinder is under tracer control, it is desirable for the tracer and tool to move away from the work for and during the return stroke of the carriage. Therefore hand valve 114 is turned to cut out line 113 and fluid is supplied to line 111 from line 112 only during the return stroke of carriage cylinder 38, which return is regulated by the fluid in line 89 from limit valve 145.

As soon as limit valve rod 82 is actuated at the end of the return stroke, fluid pressure is cut off in line 89 resulting in a fluid pressure drop in corresponding lines 112 and 111. Thus it is seen that line 111 and valve 103 are actuated only during the inoperative return stroke of the carriage and are released at the end of said return stroke. As the reciprocal movements of the carriage are continuous it will be seen that the cutter 37 takes continuous longitudinal passes relative to work piece 47 which is very slowly indexed in the manner above described.

Referring to Figs. 1 and 3, metering valve supporting plate 115 secured by screws 116 to lathe drive head 44, carries longitudinal feed cylinder metering valve 117, and cross feed cylinder metering valve 118, whereby the speed of the cylinder feed movements may be regulated.

Directional control valve 64 with its reversing mechanism 119 is carried by head 44 with supporting bracket 120 interposed. Telescoping control panel 121 positioned in spaced relation from said metering valves is supported in the following manner. Manually rotatable handle 122 journaled within a corresponding opening in panel 121 is secured to metering valve control shaft 123 with retaining collar 124 thereon. Said shaft is slidably keyed to and extends within metering valve actuating tube 125 which projects through bracket 115 and into metering valve 118.

Similarly handle 126 is also journaled in panel 121 and secured to a corresponding metering valve control shaft which likewise is slidably keyed within a second tube for rotatably controlling metering valve 117.

Panel 121 also rotatably journals directional control valve shaft 127 which carries hand wheel 65 and retaining collars 128. Shaft 127 is slidably keyed within tube 129 which is secured at its outer end to the directional control valve rotary member 64'.

Reverse valve 119 secured to and forming a part of directional control valve 64 has a rotatable member 130 which projects therefrom with gear 131 secured thereto by nut 132. Gear 131 meshes with gear 133 retained by nut 134 on the end of hollow rotatable tube 135, which is journaled through bracket 115. Reverse valve shaft 136 with handle 137 is also rotatably journaled at one end within telescoping panel 121, with its other end being slidably keyed within reverse valve actuating tube 135.

Thus it is seen that the two metering valve shafts 123, directional control valve shaft 127, and reverse valve shaft 136 are all rotatably journaled within and secured to longitudinally reciprocal telescoping control panel 121. The free ends of said rotatable shafts are slidably keyed within rotatable tubes 125, 129, and 135 respectively, whereby said metering valves, directional control valve and reverse valve may be manually controlled remotely. Slidable panel 121 permits the operator to stand in different positions relative to the lathe bed, and still have convenient manual access to said panel and the control knobs thereon.

To maintain said panel against bending, shaft 138 is secured to panel 121 and slidably extends through a corresponding supporting tube or hollow member 139 which is supported at one end within bracket 115 and at its other end within bracket 140 carried by lathe head 44. A plurality of rollers 141 are carried on the inner surface of tube 139 in spaced relation and interposed between said tube and reciprocal panel supporting shaft 138, whereby friction is minimized and possible freezing of the two members eliminated.

Having described my invention, reference is made to the claims which follow for determining the scope thereof.

We claim:

1. In a lathe having a carriage and a cross slide thereon adapted to carry a cutter and a tracer relatively to a work piece and model rotatably indexed in unison; a reciprocal fluid motor joined to said carriage and responsive to a constant fluid delivery source, a reciprocal fluid motor joined to said cross slide and responsive to a variable tracer controlled fluid, a hydraulic limit valve including a reciprocal control element oppositely engageable by said carriage for selectively delivering a pressure fluid, a direction reverse valve interconnecting said source and said carriage motor and responsive to pressure fluid from said limit valve, hydraulic tracer reversing valve means adapted to be energized only during the inoperative return stroke of said carriage, and a fluid conduit interconnecting said limit valve and said valve means.

2. In a lathe having a carriage and a cross slide thereon adapted to carry a cutter and a tracer relatively to a work piece and model rotatably indexed in unison; a reciprocal fluid motor joined to said carriage and responsive to a constant fluid delivery source, a reciprocal fluid motor joined to said cross slide and responsive to a variable tracer controlled fluid, a hydraulic limit valve including a reciprocal control element oppositely engageable by said carriage for selectively delivering a pressure fluid, a direction reverse valve interconnecting said source and said carriage motor and responsive to pressure fluid from said limit valve, a valve housing, movable means in said housing operatively engageable with said tracer for reversing the operation thereof, and a fluid conduit interconnecting said limit valve and said housing said movable means being energized by said limit valve only during the inoperative return stroke of said carriage.

3. In a lathe having a carriage and a cross slide thereon adapted to carry a cutter and a tracer relatively to a work piece and model rotatably indexed in unison; a reciprocal fluid motor joined to said carriage and responsive to a constant fluid delivery source, a reciprocal fluid motor joined to said cross slide and responsive to a variable tracer controlled fluid, a hydraulic limit valve including a reciprocal control element oppositely engageable by said carriage for selectively delivering a pressure fluid, a direction reverse valve joined to said carriage motor and responsive to pressure fluid from said limit valve, movable fluid controlling valve means in said tracer, a valve housing on said tracer, spring retained movable means in said housing operatively engageable with said tracer valve means for reversing the operation thereof, and a fluid line interconnecting said limit valve and said valve housing to intermittently actuate said movable means.

4. In a lathe having a carriage and a cross slide thereon adapted to carry a cutter and a tracer relatively to a work piece and model rotatably indexed in unison; a reciprocal fluid motor joined to said carriage and responsive to a constant fluid delivery source, a reciprocal fluid motor joined to said cross slide and responsive to a variable tracer controlled fluid, spaced dogs on said carriage, a hydraulic limit valve including a reciprocal control element with its opposite ends alternately engageable by said dogs joined to said fluid source and adapted for selectively delivering a pressure fluid, and a hydraulically actuated direction reverse valve interconnecting said source and said carriage motor and responsive to pressure fluid from said limit valve actuating said reverse valve for effecting automatic reversals of said carriage motor.

5. In a lathe having a carriage and a cross slide thereon adapted to carry a cutter and a tracer relatively to a work piece and model rotatably indexed in unison, a reciprocal fluid motor joined to said carriage and responsive to a variable tracer controlled fluid, a reciprocal fluid motor joined to said cross slide and responsive to a constant fluid delivery source, spaced dogs on said cross slide motor, a hydraulic limit valve including a reciprocal control element with its opposite ends alternately engageable by said dogs joined to said fluid source and adapted for selectively delivering a pressure fluid, and a hydraulically actuated direction reverse valve intermediate said source and said cross slide motor and responsive to pressure fluid from said limit valve actuating said reverse valve for effecting automatic reversals of said cross slide motor.

6. In a lathe having a carriage and a cross slide thereon adapted to carry a cutter and a tracer relatively to a work piece and model rotatably indexed in unison, a reciprocal fluid motor joined to said carriage and responsive to a variable tracer controlled fluid, a reciprocal fluid motor joined to said cross slide and responsive to a constant fluid delivery source, a hydraulic limit valve including a reciprocal control element oppositely engageable by said cross slide for selectively delivering a pressure fluid, a direction reverse valve interconnecting said source and said cross slide motor and responsive to pressure fluid from said limit valve, hydraulic tracer reversing valve means adapted to be energized only during the inoperative return stroke of said cross slide, and a fluid conduit interconnecting said limit valve and said valve means.

MANUEL TURCHAN.
CURTIS WALKER.

REFERENCES CITED

The following references are of record in the file of this patent:

UNITED STATES PATENTS

| Number | Name | Date |
|---|---|---|
| 1,970,181 | Monroe | Aug. 14, 1934 |
| 2,020,765 | Breitenbach | Nov. 12, 1935 |
| 2,130,627 | Kelly | Sept. 20, 1938 |
| 2,148,348 | Groene | Feb. 21, 1939 |
| 2,313,849 | Turchan | Mar. 16, 1943 |
| 2,330,890 | Horlacher | Oct. 5, 1943 |
| 2,332,532 | Roehm | Oct. 26, 1943 |
| 2,374,714 | Turchan | May 1, 1945 |
| 2,376,405 | Turchan | May 22, 1945 |
| 2,389,746 | Sparks | Nov. 27, 1945 |
| 2,390,566 | Turchan | Dec. 11, 1945 |